United States Patent [19]
Williams

[11] Patent Number: 5,855,983
[45] Date of Patent: Jan. 5, 1999

[54] FLAME RETARDANT ULTRAVIOLET CURED MULTI-LAYERED FILM

[75] Inventor: Todd R. Williams, Lake Elmo, Minn.

[73] Assignee: Minnesota Mining and Manufacturing Company, St. Paul, Minn.

[21] Appl. No.: 383,064

[22] Filed: Feb. 3, 1995

[51] Int. Cl.$^6$ .................................. B32B 3/00; B27N 9/00
[52] U.S. Cl. ...................... 428/172; 428/215; 428/412; 428/483; 428/520; 428/920; 524/127; 524/143
[58] Field of Search .................... 428/215, 412, 428/172, 520, 483, 920; 524/127, 143

[56] References Cited

U.S. PATENT DOCUMENTS

| | | | |
|---|---|---|---|
| 3,666,712 | 5/1972 | Weil | 524/127 |
| 4,262,072 | 4/1981 | Wendling et al. | 430/14 |
| 4,340,276 | 7/1982 | Maffitt et al. | 350/164 |
| 4,533,689 | 8/1985 | Tayama et al. | 524/130 |
| 4,542,449 | 9/1985 | Whitehead | 362/330 |
| 4,585,818 | 4/1986 | Jüng et al. | 524/120 |
| 4,933,233 | 6/1990 | Keough | 428/328 |
| 4,983,658 | 1/1991 | Kress et al. | 524/141 |
| 5,126,387 | 6/1992 | Hand | 524/118 |
| 5,175,030 | 12/1992 | Lu et al. | 428/30 |
| 5,183,597 | 2/1993 | Lu | 264/1.4 |

*Primary Examiner*—H. Thi Le
*Attorney, Agent, or Firm*—Robert H. Jordan

[57] ABSTRACT

A flame resistant composite film includes a first layer and a second layer that are joined together. The first layer has a light transmission of at least 93 percent and is substantially constructed from a radiation-cured polymer and a flame retardant material. The second layer is constructed primarily from thermoplastic polymer resin. The first and second layer when taken as a whole have a flame retardancy sufficient to pass VTM-2 standard of Oct. 27, 1988, of Underwriters' Laboratories, Inc. Also, microstructured films comprising such flame retardant films, backlit displays comprising such microstructured films, and computers comprising such displays.

32 Claims, 2 Drawing Sheets

FLAME RETARDANT ULTRAVIOLET CURED MULTI-LAYERED FILM

BACKGROUND OF THE INVENTION

The present invention relates generally to a flame retardant multi-layered structure. More particularly, the present invention relates to a flame retardant microstructure bearing multi-layered structure.

The use of a microstructure bearing article as a brightness enhancement film is known in the art. Illustrative brightness enhancement films are described in Whitehead, U.S. Pat. No. 4,542,449; Lu et al., U.S. Pat. No. 5,175,030; and Lu, U.S. Pat. No. 5,183,597. The Lu et al. and Lu patents disclose microstructure bearing composite polymeric articles and a method of forming microstructure bearing composite polymeric articles. The Lu et al. and Lu patents disclose forming the microstructure with desired optical properties, such as total internal reflection.

Microstructure bearing articles are made in a variety of forms. One such form includes a series of alternating tips and grooves. One example of such a form is brightness enhancement film, which has a regular repeating pattern of symmetrical tips and grooves. Other examples include patterns in which the tips and grooves are not symmetrical and in which the size, orientation, or distance between the tips and grooves is not uniform. When the included angle of the grooves is in the range of about 70° to about 120° and especially within 80° to about 100°, the article with alternating tips and grooves is useful as a brightness enhancement film.

Brightness enhancement film is typically incorporated into a liquid crystal display, which is then incorporated into an electronic device such as a lap-top computer. Devices such as lap-top computers are required to have a flammability resistance rating. For making lap-top computers, manufacturers prefer to use components that have an established flammability resistance rating. If all the components in a lap-top computer have a satisfactory flammability resistance rating, the manufacturer of the lap-top computer does not have to submit the assembled lap-top computer for a flammability resistance rating.

Prior art brightness enhancement films include "Brightness Enhancement Film", a version made from polycarbonate thermoplastic, sold by Minnesota Mining and Manufacturing Company, St. Paul, Minn. and "DIAART" a version made of a radiation cured microstructured layer on a polyester base, sold by Mitsubishi Rayon, Tokyo, Japan.

Conventional prior art brightness enhancement films manufactured from polycarbonate and radiation-cured composites, however, do not exhibit sufficient flammability resistance characteristics to qualify for the lowest flammability rating from a recognized rating organization, such as Underwriters' Laboratories, Inc. There are several difficulties that must be overcome when constructing a brightness enhancement film with flammability resistance characteristics.

Prior art flame retardant chemicals that are used to reduce the flammability of polymers are typically insoluble salts, such as antimony oxide, or highly crystalline compounds, such as decabromobiphenyl. These compounds are not suitable for use with radiation curable resins, which are preferred for making brightness enhancement film. Such compounds inhibit radiation curing of the resin or reduce the desired optical qualities of the film.

SUMMARY OF THE INVENTION

The present invention provides a flame resistant multi-layered film comprising a first layer and a second layer that are joined together. The first layer has a light transmission of at least 93 percent and is constructed substantially from a radiation-cured polymer and a flame retardant material. The second layer is constructed primarily from a thermoplastic polymer resin. The first and second layers when taken as a whole have a flame retardancy sufficient to pass the VTM-2 standard of Oct. 27, 1988, of Underwriters' Laboratories, Inc. The present invention also provides backlit displays comprising such articles, and computers comprising such displays.

These figures, which are not to scale, are intended to be merely illustrative and non-limiting.

DETAILED DESCRIPTION OF ILLUSTRATIVE EMBODIMENTS

The present invention provides a flame retardant, multi-layered film that is suitable for use as a brightness enhancement film. The multi-layered film preferably contains a relatively thick backing layer, sometimes referred to herein as a "second layer", and a relatively thin radiation-cured layer, sometimes referred to herein as a "first layer", that is formed into a microstructure suitable for a desired application.

Figure 1:
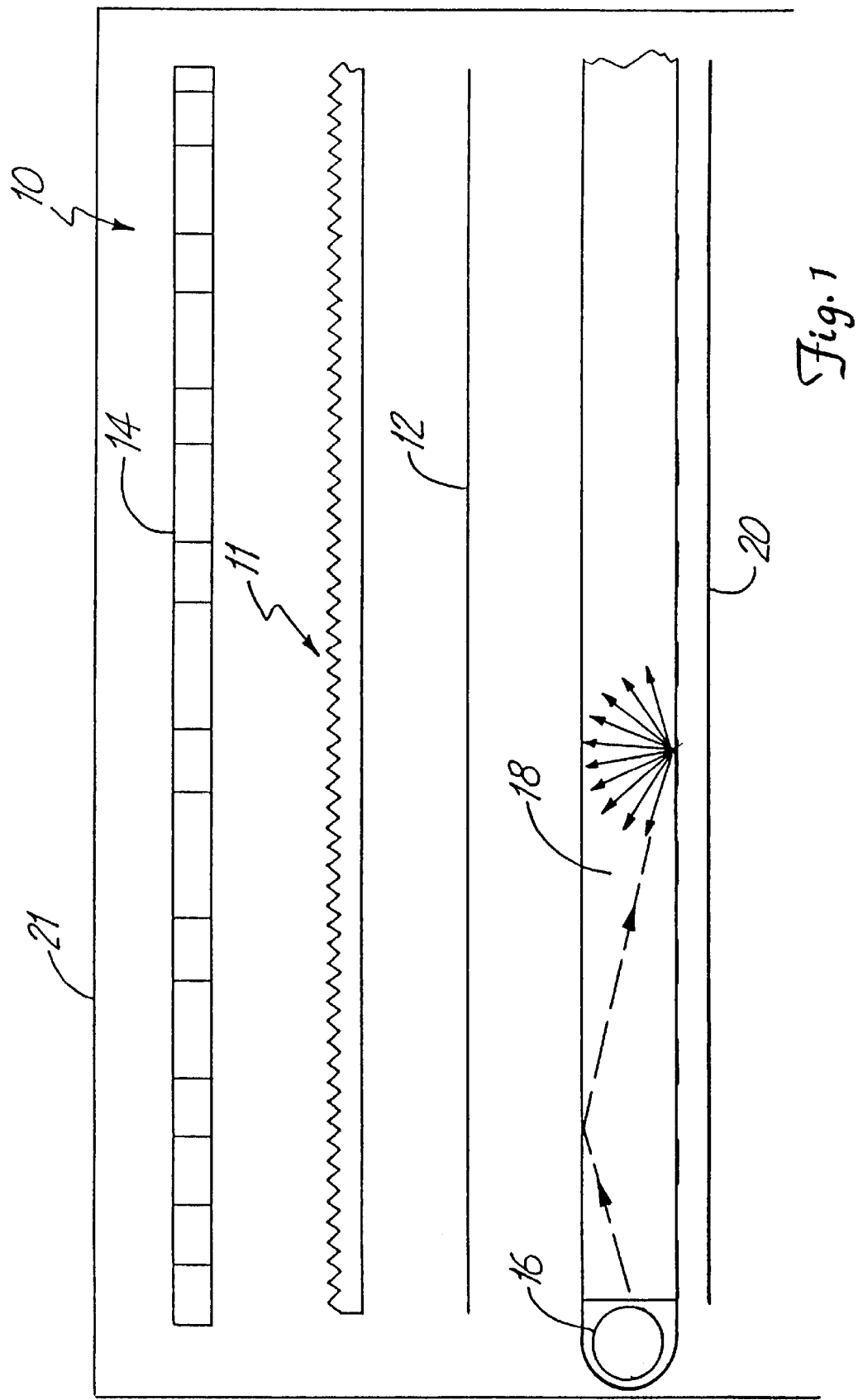
FIG. 1 is a schematic view of an illustrative film of the present invention in a backlit liquid crystal display.
Figure 2:
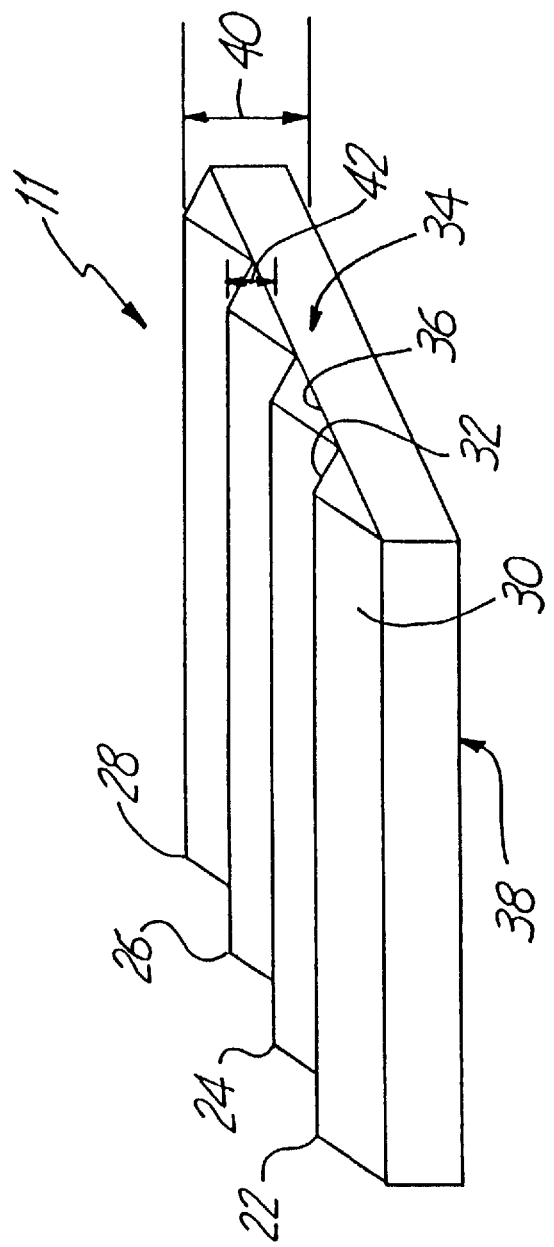
FIG. 2 is a perspective view of an illustrative microstructure bearing polymeric article of the present invention.

An illustrative backlit liquid crystal display generally indicated at 10 in FIG. 1 includes a brightness enhancement film 11 of the present invention which is typically positioned between a diffuser 12 and a liquid crystal display panel 14. The backlit liquid crystal display also includes a light source 16 such as a fluorescent lamp, a light guide 18 for transporting light for reflection toward the liquid crystal display panel 14, and a white reflector 20 for reflecting light also toward the liquid crystal display panel. The brightness enhancement film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancement film 11 in the backlit liquid crystal display is useful in equipment such as computers, personal televisions, video recorders, mobile communication devices, and automobile and avionic instrument displays, represented by reference character 21. The brightness enhancement film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 are formed on a body portion 34 that has a first surface 36 on which the prisms are formed and a second surface 38 that is substantially flat or planar and opposite the first surface.

A linear array of regular right prisms is preferred for both optical performance and ease of manufacture. By right prisms, it is meant that the apex angle $\Theta$ is typically 90°, but can also range from 70° to 120° and most preferably from 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. A typical ratio of prism height 42 to total thickness 40 is generally between 25/125 and 2/125.

The angle that the facets would form with the surface 38 if the facets were to be projected would typically be 45°. However, this angle would vary depending on the pitch of the facet or the angle Θ of the apex.

The multi-layered structure according to the present invention has an additional benefit of exhibiting sufficient flame retardance characteristics to qualify for Underwriters' Laboratories, Inc.'s lowest flammability rating of VTM-2 dated Oct. 27, 1988. As a result of the VTM-2 rating, a manufacturer who incorporates the present brightness enhancement film into a device with other components, which all have the VTM-2 rating, can avoid the time and expense of certifying that the entire device has a VTM-2 rating.

Neither the microstructured layer nor most of the backing materials used in prior art brightness enhancement films consistently meet the VTM-2 standard.

The microstructure bearing film is preferably formed according to a process similar to the processes disclosed in Lu et al., U.S. Pat. No. 5,175,030, and Lu, U.S. Pat. No. 5,183,597. The formation process preferably includes the following steps:

(a) preparing an oligomeric resin composition;

(b) depositing the oligomeric resin composition onto a master negative microstructured molding surface in an amount barely sufficient to fill the cavities of the master; and (c) filling the cavities by moving a bead of the composition between a preformed backing and the master, at least one of which is flexible.

(d) curing the oligomeric composition and removing the microstructure bearing article to form the master.

The oligomeric resin composition of step (a) is a one-part, solvent-free, radiation-polymerizable, cross-linkable, organic oligomeric composition. In one embodiment, the oligomeric composition is a blend of a radiation curable component and at least one non-acrylate flame retardant chemical. A photoinitiator may also be used, typically in a concentration of about approximately 0.1 to 1.0 percent by weight of the oligomeric composition. Higher concentrations of the photoinitiator can be used but are not normally needed to obtain the desired properties.

The radiation curable portion of the oligomeric composition comprises between about 70 and 100 percent by weight of the oligomeric composition and may contain more than one component. At least one of the components is preferably brominated. In some embodiments the polymerized oligomeric composition contains at least approximately 10 percent of a bromine substituted component.

Components that provide a high refractive index material are especially suitable for use in the radiation-cured polymers. Examples of such components along with their preferred trade name and manufacturer include: bisphenol-A epoxy diacrylate (PHOTOMER Brand 3016, Henkel Corporation of Ambler, Pa.), phenoxyethyl acrylate (PHOTOMER Brand 4035, Henkel Corporation of Ambler, Pa.), tribromophenoxyethyl acrylate (BR-31, Dai-Ichi Chemical of Elk Grove Village, Ill.), tetrabromobisphenol-A diacrylate (SR-640, Sartomer Company of Exton, Pa.), benzyl acrylate (SR-432, Sartomer Company of Exton, Pa.), and tetrabromobisphenol-A ethoxylated diacrylate (RDX 51027, UCB-Radcure of Smyrna, Ga.). Examples of other components which can be used but which give a lower refractive index include: neopentylglycol propoxylate diacrylate (PHOTOMER Brand 4127, Henkel Corporation of Ambler, Pa.), polyether-based urethane acrylate oligomer (EBECRYL Brand 4826, UCB-Radcure of Smyrna, Ga.), polyester-based urethane acrylate oligomer (PHOTOMER Brand 6010, Henkel Corporation of Ambler, Pa.).

It is known in the art that combinations of bromine-containing compounds and phosphorous-containing compounds give useful flame retardant properties. Such combinations are typically used to render thermoplastics, such as polycarbonate or polystyrene, flame retardant. However, when such compounds are mixed with (meth)acrylic-functional compounds useful in radiation curable compositions for optical devices, the resulting mixtures are not clear solutions. Even when the uncured mixtures are clear solutions, the cured articles are usually not optically clear. This result is common when radiation curable and non-radiation curable components are mixed and cured with radiation such as ultraviolet or visible light. For the manufacture of optically clear articles by radiation curing, it would be advantageous to employ only components which have (meth)acrylate functionality, such that the components would react with each other and give a clear, colorless polymer. Preferably, the clear colorless polymer has a sufficiently low absorption coefficient that no more than 7 percent of the light incident on the first layer is lost by absorption. However, a significant portion of the transmitted light may be internally reflected by the external (particularly when faceted) surface of the first layer, or reflected by other surfaces and interfaces of the film, resulting in net light transmission lower than 93 percent. The term "light transmission rate of at least 93 percent" is defined to mean that the percentage of light which is not absorbed as the light is transmitted through the maximum thickness of the first layer is at least 93 percent of the light incident on the first layer.

This invention embodies the discovery that some non-acrylate, phosphorus-containing flame retardant chemicals have both enough solubility and enough flame retardant properties to be useful in fabricating flame retardant microstructured optical films. By "non-acrylate" it is meant that the chemicals do not contain any significant amount of (meth)acrylate groups and are not considered radiation-polymerizable by those skilled in the art. Such phosphorus-containing flame retardant chemicals have a low tendency to bleed or be exuded from the cured resin and are preferred. Illustrative examples of such chemicals along with their preferred trade name and manufacturer include: cyclic phosphonate ester (AB-19, Albright and Wilson of Richmond, Va.), halogenated phosphate ester (HP-36, Great Lakes Chemical Corporation of West Lafayette, Ind. and PB 460, FMC Corporation of Princeton, N.J.). Typically the flame retardant chemical constitutes less than 30 weight percent, preferably less than 10 weight percent of the oligomeric composition.

The viscosity of the oligomeric composition deposited in step (b) is preferably between 1,000 centipoise (1.0 pascal-seconds) and 5,000 centipoise (5.0 pascal-seconds). If the oligomeric composition has a viscosity above this range, air bubbles might become entrapped in the composition. Additionally, the composition might not completely fill the cavities in the master. When an oligomeric composition with a viscosity below that range is used, the oligomeric composition usually tends to experience shrinkage upon curing that prevents the oligomeric composition from accurately replicating the master.

Polymerization can be accomplished by usual means, such as heating in the presence of free radical initiators, irradiation with ultraviolet or visible light in the presence of suitable photoinitiators, and by irradiation with electron beams. For reasons of convenience, low capital investment, and production speed, the preferred method of polymerization is by irradiation with ultraviolet or visible light in the presence of a photoinitiator at a concentration of about 0.1 percent to about 1.0 percent by weight of the oligomeric composition. Higher concentrations can be used but are not normally needed to obtain the desired cured resin properties. The curing conditions and the processes disclosed in U.S. Pat. Nos. 5,175,030 and 5,183,597 are considered satisfactory to prepare the microstructure bearing article of this invention.

The ideal backing for the flame retardant microstructure bearing article would be a backing which was by itself flame retardant. However, known polymeric films which are sold as "flame retardant" are not optically clear enough to be useful in optically functional microstructure bearing articles, such as a brightness enhancement film. Polyvinylchloride film, for example, is inherently flame retardant, but it is not available in the optical quality needed for such a film to be useful in a brightness enhancement film. Therefore, commonly available, clear polymeric films are preferred.

Polyethylene terephthalate or polycarbonate film are preferable for use as a backing in step (c) because the materials are economical, optically clear, and have good tensile strength. Thickness of 0.025 millimeter to 0.5 millimeter are preferred, and thickness of 0.075 millimeter to 0.175 millimeter are especially preferred.

Other useful backings for the microstructure bearing articles include cellulose acetate butyrate, cellulose acetate propionate, polyether sulfone, polymethyl methacrylate, and polyurethane. Glass is also useful in certain articles, but does not have the flexibility and toughness available that the polymeric films mentioned above have. The surface of the backing may also be treated to promote adhesion to the oligomeric composition.

Polyethylene terephthalate based materials having good optical qualities and acceptable adhesion are preferred. Examples of such polyethylene terephthalate based materials include: a photograde polyethylene terephthalate; a polyethylene terephthalate (PET) having a surface that is formed according to the method described in U.S. Pat. No. 4,340,276 (Example 5), referred to herein as "SEP-PET"; and MELINEX PET manufactured by ICI Films of Wilmington, Delaware. The SEP-PET has a material such as chromium applied in an amount which results in a composite surface on which portions of the underlying PET are exposed between discontinuous microislands of the material. The composite surface is sputter etched with an oxygen plasma to preferentially etch the exposed portions of the higher sputtering rate PET, while the discontinuous microislands are etched at a lower rate, resulting in a topography of micropedestals which vary in height within a range of approximately 0.01 and 0.2 $\mu$m and which are separated from adjacent micropedestals a distance within a range of approximately 0.05 to 0.5 $\mu$m.

Preferred polycarbonate based materials and manufacturers include: PCEE 600, a specially-formulated polycarbonate film, that was formerly obtainable from Miles Inc. of Pittsburgh, Pa. but no longer available; MILES Brand PCEE manufactured by Miles Inc. of Pittsburgh, Pa.; LEXAN Brand 8050 manufactured by GE Plastics Company of Pittsfield, Mass. Polycarbonate film that is modified to be flame retardant is available from GE Plastics Company. However, it is more expensive than unmodified polycarbonate film, tends to have higher optical absorption, and is not available in thicknesses below 0.25 millimeter.

A cross-linking agent may also be added to the oligomeric resin composition to further aid in the cross-linking of the polymer. Illustrative examples of suitable cross-linking agents include: 1,4-butylene di-methacrylate or -acrylate; ethylene di-methacrylate or -acrylate; trimethylolpropane di- or tri-acrylate; glyceryl di-acrylate or -methacrylate; glyceryl tri-acrylate or -methacrylate; glycidyl acrylate or methacrylate; pentaerythritol triacrylate or trimethacrylate; diallyl phthalate; 2,2-bis(4-methacryloxyphenyl)-propane; diallyl adipate; di(2-acryloxyethyl) ether; dipentaerythritol pentacrylate; neopentyl glycol diacrylate or dimethacrylate; polypropylene glycol diacrylate or dimethacrylate; 1,3,5-tri-(2-methacryloxyethyl)-s-triazine; hexamethylene diacrylate or dimethacrylate; poly(ethylenically unsaturated alkoxy) heterocycles, as taught in U.S. Pat. No. 4,262,072; and adducts of poly(isocyanates) with hydroxy- and amino-functional acrylates, such as EB220 sold by UCB-Radcure, Smyrna, Ga. Cross-linking agents used to make polymers with a refractive index of greater than 1.56, such as EB220, are especially useful.

A preferred master for use with the above described method is a metallic master, such as nickel, nickel-plated copper or brass. If the temperature of the curing and optional simultaneous heat treating step is not too great, the master can also be constructed from a thermoplastic material, such as a laminate of polyethylene and polypropylene.

After the oligomeric resin fills the cavities between the backing and the master, the oligomeric resin is cured and heat treated, if desired. The cured multi-layered structure is then removed from the master.

Samples of the multi-layered structure are then examined for flame retardance characteristics. Flame retardance is measured according to VTM-2 procedure dated Oct. 27, 1988 set forth by Underwriters' Laboratories.

The results of the test performed on examples designed to illustrate the invention are reported in Table 1. Table 1 contains examples of coated and uncoated structures. Composition amounts are expressed in percent by weight.

TABLE 1

| Spl. No. | Backing | Backing Thickness ($10^{-3}$ mm) | Photomer 3016 | Photomer 4035 | RDX 51027 | BR-31 | AB-19 | AB-100 | HP-36 | Coating Thickness ($10^{-3}$ mm) | VTM-2 |
|---|---|---|---|---|---|---|---|---|---|---|---|
| 1 | PCEE 600 | 250 | | | | | | | | none | pass |
| 2 | PCEE 600 | 250 | 60% | 40% | | | | | | 88–125 | fail |
| 3 | LEXAN 8050 | 250 | | | | | | | | none | fail |
| 4 | MILINEX PET | 125 | | | | | | | | none | fail |
| 5 | MILINEX PET | 125 | | | 33% | 67% | | | | 25–37 | fail |
| 6 | MILINEX PET | 125 | | 40% | 60% | | | | | 50 | fail |
| 7 | MILINEX PET | 125 | | 40% | 60% | | | | | 63 | fail |

TABLE 1-continued

| Spl. No. | Backing | Backing Thickness (10⁻³ mm) | Photomer 3016 | Photomer 4035 | RDX 51027 | BR-31 | AB-19 | AB-100 | HP-36 | Coating Thickness (10⁻³ mm) | VTM-2 |
|---|---|---|---|---|---|---|---|---|---|---|---|
| 8 | MILINEX PET | 125 | | 40% | 60% | | | | | 63–88 BEF | fail |
| 9 | MILINEX PET | 125 | | 36% | 54% | | 10% | | | 25 | pass |
| 10 | MILINEX PET | 125 | | 36% | 54% | | 10% | | | 63 | pass |
| 11 | MILINEX PET | 125 | | 36% | 54% | | 10% | | | 88–100 | pass |
| 12 | MILINEX PET | 125 | | 36% | 54% | | 10% | | | 50–63 BEF | pass |
| 13 | MILINEX PET | 125 | | 36% | 54% | | | 10% | | 25–37 | pass |
| 14 | MILINEX PET | 125 | | 36% | 54% | | | 10% | | 50 | pass |
| 15 | MILINEX PET | 125 | | 36% | 54% | | | 10% | | 63–75 | pass |
| 16 | MILINEX PET | 125 | | 36% | 54% | | | | 10% | 25–37 | fail |
| 17 | MILINEX PET | 125 | | 36% | 54% | | | | 10% | 50 | pass |
| 18 | MILINEX PET | 125 | | 36% | 54% | | | | 10% | 100–125 | pass |
| 19 | MILINEX PET | 125 | | 36% | 54% | | | | 10% | 37–50 BEF | pass |
| 20 | MILES PCEE | 125 | | | | | | | | none | ps/fl |
| 21 | MILES PCEE | 125 | 60% | 40% | | | | | | 63 BEF | fail |
| 22 | MILES PCEE | 125 | 60% | 40% | | | | | | 25 BEF | fail |
| 23 | MILES PCEE | 125 | | 40% | 60% | | | | | 75 BEF | fail |
| 24 | MILES PCEE | 125 | | 40% | 60% | | | | | 50–63 | pass |
| 25 | MILES PCEE | 125 | | 40% | 60% | | | | | 88–125 | pass |
| 26 | MILES PCEE | 125 | | 40% | 60% | | | | | 113–125 | pass |
| 27 | MILES PCEE | 125 | | 36% | 54% | | 10% | | | 37–50 | fail |
| 28 | MILES PCEE | 125 | | 36% | 54% | | 10% | | | 63–75 | pass |
| 29 | MILES PCEE | 125 | | 36% | 54% | | 10% | | | 88 | pass |
| 30 | MILES PCEE | 125 | | 36% | 54% | | | 10% | | 63–88 | ? |
| 31 | MILES PCEE | 125 | | 36% | 54% | | | 10% | | 88–100 | ? |
| 32 | MILES PCEE | 125 | | 36% | 54% | | | 10% | | 113–138 | fail |
| 33 | MILES PCEE | 125 | | 36% | 54% | | | | 10% | 50 | fail |
| 34 | MILES PCEE | 125 | | 36% | 54% | | | | 10% | 63–75 | ? |
| 35 | MILES PCEE | 125 | | 36% | 54% | | | | 10% | 75–100 | fail |
| 36 | MILES PCEE | 125 | | 45% | | 45% | 10% | | | 50–63 | ? |
| 37 | MILES PCEE | 125 | | 50% | | 50% | | | | 50–125 | ? |
| 38 | MILES PCEE | 125 | | | 33% | 67% | | | | 37 | pass |
| 39 | MILES PCEE | 125 | 14% | 29% | | 57% | | | | 25–37 | pass |
| 40 | MILES PCEE | 125 | 50%[1] | | | 50% | | | | 50–88 | fail |
| 41 | MILES PCEE | 125 | 80%[2] | | | | 20% | | | 88–100 | fail |
| 42 | MILES PCEE | 125 | 80%[3] | | | | 20% | | | 75 | fail |
| 43 | MILES PCEE | 125 | | 16%[4] | 37% | | 47%[5] | | | 37–63 BEF | fail |
| 44 | 3M PET | 88 | 48% | 32% | | | | | 20% | 88 | fail |
| 45 | 3M PET | 100 | | 40% | 60% | | | | | 50 | fail |
| 46 | 3M PET | 100 | | 36% | 54% | | 10% | | | 12–25 | fail |
| 47 | 3M PET | 100 | | 36% | 54% | | | 10% | | 25 | fail |
| 48 | 3M PET | 100 | | 36% | 54% | | | | 10% | 25–37 | fail |
| 49 | 3M PET | 100 | | 32% | 48% | | 20% | | | 75–88 | pass |
| 50 | 3M PET | 100 | | 32% | 48% | | | 20% | | 75–88 | pass |
| 51 | 3M PET | 100 | | 32% | 48% | | | | 20% | 88 | pass |
| 52 | SEP-PET | 113 | | | | | | | | none | fail |
| 53 | SEP-PET | 113 | | | 33% | 67% | | | | 50–100 BEF | pass |

[1] PHOTOMER Brand 4127 resin
[2] EBECRYL Brand 4826 resin
[3] PHOTOMER Brand 6010 resin
[4] SR-640 resin
[5] SR-432 resin Entries in the Coating Thickness column with a "BEF" indicate that the composite structure was a brightness enhancement film, i.e., had a microstructured surface as opposed to just being a two layer laminate. Entries in the VTM-2 column indicate the results obtained from performing that test procedure. For each sample, a battery of five specimens was tested. In accordance with the test procedure, if a given specimen burns for more than 30 seconds and/or burns for more than 5 inches (12.5 cm) from the bottom, the specimen was deemed a failure. In some instances, certain samples were tested again later, e.g., to verify standards. The results are tabulated as follows: "pass" indicates that when a battery of five specimens were tested all five passed, or one of the first battery of five specimens failed and then all five in a second battery of five passed; "?" indicates that at least one specimen failed in a battery of five specimens and no other specimens were tested; "ps/fl" indicates that all five specimens in the first battery of five passed but that one specimen of a second battery of five failed; "failed" indicates that at least one specimen failed in a first battery of five, and at least one specimen failed in a second battery of five.

As illustrated by Samples 9–19, 27–35, and 46–51, the multi-layered structures that contain a relatively high percentage of brominated component(s) along with a phosphorous-based flame retardant provide the best flame retardant characteristics. However, when examining Samples 9, 10, 27, 28, 46, and 49, it can be seen flame retardant concentration and microstructure resin thickness needed to provide satisfactory flammability resistance is dependent upon the backing material used in the multi-layered structure. With the MILES PCEE backing used in Samples 24–26, a sufficiently thick layer of halogenated resin containing microstructure without a flame retardant can result in a multi-layered structure that meets the VTM-2 standard.

However, a thick microstructured layer is not desirable because the microstructured layer should not inhibit the flexibility of the composite structure. For these resins, which are preferable for brightness enhancement film, a microstructured layer with thickness greater than about 20 percent of the backing thickness typically tends to cause curling of the composite structure after curing. In addition, if the microstructure layer gets hard and thick, it tends to flake or chip off the backing when the backing is bent. Thus, it is desirable for both the backing and the coating to be as flame retardant as possible, so that the multi-layered structure will pass the VTM-2 standard with even a thin coating.

If the coating contains a sufficient concentration of brominated resin, as in Samples 5, 38 and 53, the composite can pass the VTM-2 standard if the coating is thick enough and the right backing is used. Unfortunately, this particular microstructured material does not stick to any backing except specially primed SEP-PET. As illustrated in Samples 41 and 42, even a relatively high amount of flame retardant and a thick coating cannot overcome the flammability of non-brominated resins.

The multi-layered structure illustrated in Samples 12, 19, and 53 are examples of flame retardant brightness enhancement film. Such a brightness enhancement film, when incorporated into a portable electronic device with other VTM-2 rated materials, would enable the manufacturer of the portable electronic device to avoid the time and expense of undergoing flammability resistance testing of the entire device.

Based on the results in Table 1, it can be seen that the proper combination of acrylate-functional resin components, non-acrylate functional flame retardant, and backing provide a brightness enhancement film that meets the VTM-2 requirements. Table 1 also illustrates how subtle changes in the microstructured layer composition can make a difference between passing and failing the VTM-2 test. It can also be seen that if an ultraviolet radiation-cured resin microstructured layer is sufficiently thick and flame retardant, it can cause the entire composite structure to pass the VTM-2 test.

Although the present invention has been described with reference to preferred embodiments, workers skilled in the art will recognize that changes may be made in form and detail without departing from the spirit and scope of the invention.

What is claimed is:

1. A flame resistant multi-layered film comprising:
   a first layer and a second layer joined together,
   the first layer being substantially composed of a polymerized (meth)acrylic-functional oligomeric composition and a flame retardant chemical and having a light transmission rate of at least 93 percent, and
   the second layer substantially composed of thermoplastic polymer,
   wherein the first and second layers have a combined flame retardancy sufficient to pass VTM-2 standard of Oct. 27, 1988, of Underwriters' Laboratories, Inc.

2. The film of claim 1 wherein the first layer is thinner than the second layer.

3. The film of claim 2 wherein said second layer is between 0.025 and 0.5 millimeter thick.

4. The film of claim 2 wherein the thickness of said first layer is not greater than 20 percent of the thickness of said second layer.

5. The film of claim 1 wherein the flame retardant chemical is a non-acrylate.

6. The film of claim 5 wherein the non-acrylate flame retardant chemical used in the first layer is cyclic phosphonate ester, halogenated phosphate ester, or combinations thereof.

7. The film of claim 6 wherein said first layer is the polymerized product of an oligomeric composition comprising less than 30 weight percent of said flame retardant chemical.

8. The film of claim 6 wherein said first layer is the polymerized product of an oligomeric composition comprising less than 10 weight percent of said flame retardant chemical.

9. The film of claim 1 wherein the polymerized oligomeric composition contains at least approximately 10 percent of a bromine substituted component.

10. The film of claim 1 wherein the polymerized oligomeric composition used in the first layer comprises at least one of the following: bisphenol-A epoxy diacrylate, brominated bisphenol-A epoxy diacrylate, phenoxyethyl acrylate, tribromophenoxyethyl acrylate, tetrabromobisphenol-A diacrylate, benzyl acrylate, tetrabromobisphenol-A ethoxylated diacrylate, or combinations thereof.

11. The film of claim 1 wherein the second layer is formed from polyethylene-terephthalate or polycarbonate.

12. The film of claim 1 wherein said first layer further comprises a cross-linking agent.

13. The film of claim 8 wherein the cross-linking agent comprises at least one of the following: 1,4-butylene di-methacrylate or -acrylate; ethylene di-methacrylate or -acrylate; trimethylolpropane di- or tri-acrylate; glyceryl di-acrylate or -methacrylate; glyceryl tri-acrylate or -methacrylate; glycidyl acrylate or methacrylate; pentaerythritol triacrylate or trimethacrylate; diallyl phthalate; 2,2-bis(4-methacryloxyphenyl)-propane; diallyl adipate; di(2-acryloxyethyl) ether; dipentaerythritol pentacrylate; neopentyl glycol diacrylate or dimethacrylate; polypropylene glycol diacrylate or dimethacrylate; 1,3,5-tri-(2-(meth)acryloxyethyl)-s-triazine; hexamethylene diacrylate or dimethacrylate; poly(ethylenically unsaturated alkoxy) heterocycles; adducts of poly(isocyanates) with hydroxy- and amino- functional acrylates, or combinations thereof.

14. The film of claim 1 wherein the second layer has a sputter etched surface adjacent to the first layer.

15. The film of claim 1 wherein a surface of the first layer has microstructures formed therein.

16. The film of claim 1 further comprising a photoinitiator.

17. The film of claim 1 wherein said flame retardant material is not chemically bound to said polymerized oligomeric composition.

18. A flame resistant brightness enhancement film for use in a liquid crystal display comprising:
    a first layer being substantially constructed from a polymerized (meth)acrylic-functional oligomeric composition and a flame retardant material, the first layer having a light transmission rate of at least 93 percent, and
    a second layer substantially composed of thermoplastic polymer resin,
    the first and second layer being joined together and having a combined flame retardancy sufficient to pass VTM-2 standard of Oct. 27, 1988, of Underwriters' Laboratories, Inc.

19. The brightness enhancement film of claim 18 wherein the flame retardant material is a non-acrylate.

20. The brightness enhancement film of claim 19 wherein the non-acrylate flame retardant material used in the first layer is cyclic phosphonate ester, halogenated phosphate ester, or combinations thereof.

21. The brightness enhancement film of claim 20 wherein said first layer is the polymerized product of an oligomeric composition comprising less than 30 weight percent of said flame retardant chemical.

22. The brightness enhancement film of claim 20 wherein said first layer is the polymerized product of an oligomeric composition comprising less than 10 weight percent of said flame retardant chemical.

23. The brightness enhancement film of claim 18 wherein the second layer is thicker than the first layer.

24. The film of claim 23 wherein said second layer is between 0.025 and 0.5 millmeter thick.

25. The film of claim 23 wherein the thickness of said first layer is not greater than 20 percent of the thickness of said second layer.

26. The brightness enhancement film of claim 18 wherein the polymerized oligomeric composition used in the first layer comprises at least one of the following: bisphenol-A epoxy diacrylate, brominated bisphenol-A epoxy diacrylate, phenoxyethyl acrylate, tribromophenoxyethyl acrylate, tetrabromobisphenol-A diacrylate, benzyl acrylate, tetrabromobisphenol-A ethoxylated diacrylate, or combinations thereof.

27. The brightness enhancement film of claim 18 wherein the second layer is formed from polyethylene terephthalate or polycarbonate.

28. The brightness enhancement film of claim 18 wherein said first layer further comprises a cross-linking agent.

29. The brightness enhancement film of claim 28 wherein the cross-linking agent comprises at least one of the following: 1,4-butylene di-methacrylate or -acrylate; ethylene di-methacrylate or -acrylate; trimethylolpropane di- or tri-acrylate; glyceryl di-acrylate or -methacrylate; glyceryl triacrylate or methacrylate; glycidyl acrylate or methacrylate; pentaerythritol triacrylate or trimethacrylate; diallyl phthalate; 2,2-bis(4-methacryloxyphenyl)-propane; diallyl adipate; di(2-acryloxyethyl) ether; dipentaerythritol pentacrylate; neopentyl glycol diacrylate or dimethacrylate; polypropylene glycol diacrylate or dimethacrylate; 1,3,5-tri-(2-(meth)acryloxyethyl)-s-triazine; hexamethylene diacrylate or dimethacrylate; poly(ethylenically unsaturated alkoxy) heterocycles; adducts of poly(isocyanates) with hydroxy- and amino- functional acrylates, or combinations thereof.

30. The film of claim 18 wherein the second layer has a sputter etched surface adjacent to the first layer.

31. The film of claim 18 further comprising a photoinitiator.

32. The brightness enhancement film of claim 18 wherein said flame retardant material is not chemically bound to said polymerized oligomeric composition.

* * * * *